(12) United States Patent
Errecalde (10) Patent No.: US 7,055,450 B2
(45) Date of Patent: Jun. 6, 2006

(54) TRANSPORTATION VEHICLE AND METHOD OPERABLE WITH IMPROVED DRAG AND LIFT

(76) Inventor: George A. Errecalde, 805 S. Ridgewood Ave., Lot #21, Edgwater, FL (US) 32132

( * ) Notice: Subject to any disclaimer, the term of this patent is extended or adjusted under 35 U.S.C. 154(b) by 0 days.

(21) Appl. No.: 11/123,416

(22) Filed: May 6, 2005

(65) Prior Publication Data

US 2005/0247250 A1    Nov. 10, 2005

Related U.S. Application Data

(60) Provisional application No. 60/568,516, filed on May 6, 2004.

(51) Int. Cl.
  *B63B 1/16* (2006.01)
(52) U.S. Cl. ....................... 114/272; 244/105
(58) Field of Classification Search ............... 114/272, 114/273; 244/105, 106
  See application file for complete search history.

(56) References Cited

U.S. PATENT DOCUMENTS

| | | | |
|---|---|---|---|
| 2,044,771 A | 6/1936 | Carr, Jr. | |
| 2,126,304 A | 8/1938 | Apel et al. | |
| 2,397,683 A | 4/1946 | Nelson | |
| D148,081 S | 12/1947 | Mertes | |
| 2,474,667 A | 6/1949 | Harvey | |
| 2,909,140 A | 10/1959 | Kiekhaefer | |
| D189,656 S | 1/1961 | Eddy | |
| D190,698 S | 6/1961 | Martindale | |
| 3,226,739 A | 1/1966 | Noe | |
| 3,316,874 A | 5/1967 | Canazzi | |
| 3,661,111 A * | 5/1972 | Lippisch | 114/67 A |
| D241,730 S | 10/1976 | Caccicarne | |
| 4,233,920 A | 11/1980 | Wood et al. | |
| 4,237,810 A | 12/1980 | Westfall | |
| 4,365,578 A * | 12/1982 | Schellhaas | 114/272 |
| 4,603,650 A | 8/1986 | Bjorn | |
| D286,279 S | 10/1986 | Maher | |
| 4,627,376 A | 12/1986 | Scarfo et al. | |
| 4,705,234 A * | 11/1987 | Bourn | 244/12.1 |
| 4,774,902 A | 10/1988 | Sinclair, Jr. | |
| 4,781,141 A | 11/1988 | Webb et al. | |
| 4,813,365 A | 3/1989 | Lindstrom et al. | |
| 4,858,549 A | 8/1989 | Boden | |
| 4,883,015 A * | 11/1989 | Jorg | 114/272 |
| D307,574 S | 5/1990 | Pipkorn | |
| D318,844 S | 8/1991 | Hargett, Sr. | |
| 5,199,373 A | 4/1993 | Mardikian | |
| 5,357,894 A | 10/1994 | Jacobson | |
| 5,452,676 A | 9/1995 | Fiore | |
| D374,853 S | 10/1996 | Pierce | |

(Continued)

*Primary Examiner*—Sherman Basinger
(74) *Attorney, Agent, or Firm*—Allen, Dyer, Doppelt, Milbrath & Gilchrist, P.A.

(57) ABSTRACT

A powered transportation vehicle uses hydro and aero pressure lift on flat bottom surfaces for providing increased efficiency of operation. An elongate hull has a bottom surface having a large length to width aspect ratio operates in water, with a smaller aspect ratio for a second lifting body operating substantially in air. Trailing edges of the bottom surfaces form a seal with water for creating stagnation areas for the water and air for providing lift to the vehicle having a center of lift of the hull forward the center of gravity of the vehicle. A forward portion of the hull bottom surface is upwardly angled from an aft portion as measured from the center of gravity.

30 Claims, 8 Drawing Sheets

U.S. PATENT DOCUMENTS

| | | |
|---|---|---|
| D407,682 S | 4/1999 | Mannerfelt |
| RE36,879 E | 9/2000 | Schoell |
| 6,250,246 B1 | 6/2001 | Hubley |
| 6,260,503 B1 | 7/2001 | Allison |
| 6,415,731 B1 | 7/2002 | Chrunyk |
| 6,439,148 B1 | 8/2002 | Lang |
| 6,604,478 B1 | 8/2003 | Barsumian |
| 6,666,160 B1 | 12/2003 | Orneblad |

\* cited by examiner

TRANSPORTATION VEHICLE AND METHOD OPERABLE WITH IMPROVED DRAG AND LIFT

CROSS-REFERENCE TO RELATED APPLICATIONS

This application claims the benefit of U.S. Provisional Application No. 60/568,516, filed May 6, 2004, the disclosure of which is hereby incorporated by reference in its entirety.

FIELD OF THE INVENTION

The present invention generally relates to surface effects vehicles, and more particularly to powered water surface vehicles.

BACKGROUND OF THE INVENTION

With the sea continuing to be relied upon for transportation, a growing need for efficient water travel is created. Typically, surface effects vessels use cushions of air to reduce friction between the hull and water, with some injecting air under the hull. A variety of hull designs have been developed with speed and efficiency in mind, as illustrated by way of example, with reference to U.S. Pat. No. 6,604,478. Boats have been known to include skids and keel steps for forming aeration channels for providing increased speed, as illustrated by way of example with reference to U.S. Pat. No. 4,858,549. Typically, streamlining a hull reduces hydrodynamic drag for minimizing areas of turbulence and wasted energy. As a result, various hull shapes result and may include hydroplaning hulls as described in U.S. Pat. No. 6,666,160 for a high aspect dynamic lift boat hull having a hull step amidships.

Existing lifting body technology, used by planing boats in water, and experimental lifting bodies of the National Aeronautics and Space Administration (NASA) that led to shuttle in air, requires large amounts of power. This may provide one explanation as to why neither planing boats nor aero lifting bodies are used for large-scale transportation. The typically large power requirements can be attributed to the high resistance produced when the whole underside of craft is angled to create lift which as a consequence creates large drag, therefore referred to as drag lift.

Even with the variety of water transportation vehicles made available to date, there remains a need for improved efficiency in water surface transportation. The present invention is directed to providing an efficient transportation vehicle for operating in and over water.

SUMMARY OF THE INVENTION

A powered transportation vehicle uses hydro pressure lift in conjunction with aero pressure lift for providing high speed and efficiency. The vehicle may be described as comprising first and second lifting bodies operable for providing lift to the vehicle and thus an increased efficiency of operation. In keeping with the teachings of the present invention, the first lifting body includes an elongate hull operable for being propelled through a first medium, such as water. The elongate hull has a substantially flat first bottom surface extending from a forward most portion of the elongate hull aft to proximate a center of gravity of the vehicle. The first bottom surface is defined as having an angle of attack with respect to the first medium. A first trailing edge of the elongate hull is operable for forming a seal with the first medium as the elongate hull moves through the water causing a stagnation of the water on the first bottom surface. A center of lift of the first lifting body is forward the center of gravity of the vehicle when the vehicle is being propelled. The second lifting body is generally operable in a second medium, such as air as herein described, by way of example, for embodiments of the invention. The second lifting body is described as having a second bottom surface substantially out of contact with the first medium during operation of the vehicle, and includes a second trailing edge forming a seal with the first medium as the vehicle is propelled, thus causing a stagnation of the air on the second bottom surface. In further keeping with the teachings of the present invention, an aspect ratio of the first bottom surface is greater than the aspect ration of the second bottom surface, with the aspect ratio being defined as a ratio of an effective length dimension to an effective width dimension for forming a stagnation surface area.

In alternate embodiments of the invention, a forward portion of the first bottom surface is upwardly angled from an aft portion as measured from a location on the first bottom surface proximate a center of gravity of the apparatus. Optionally, the aft portion may smoothly transition to the forward portion through a non-stepped contiguous change in the angle of attack of the elongate hull as it moves through the first medium.

Unlike typical vehicles such as watercrafts, relatively much smaller surfaces are exposed to oncoming flow to create lift, with most of the craft shaped to disturb the flow as little as possible. With efficient momentum transfer from fluid to lift surfaces as lift, only relatively small areas need to be introduced in to the slipstream to slow or stagnate fluid for creating a desirable high pressure and therefore lift. The balance of the craft then offers the least amount of resistance possible to forward motion.

As herein presented, by way of example, embodiments of the invention treat both water and air, media in a similar manner and compensate for density with speed and size of lift areas. Smaller surfaces that work well in water, work equally as well in air at higher speeds. Treating both media in a similar manner, makes a vehicle equally at home in both air and water, and most importantly when it is in a "in between state", partially supported by water and partially supported by air, it excels.

Embodiments of the invention may also seek to reduce weight of a vehicle and increase the inertial value of a bearing surface, thus reducing the need for power to maintain altitude. As speed increases, surface or ground effects that were supporting the vehicle are transferred to air effects and may ultimately result in free flight at relatively modest speeds. These speeds will vary according to weight/lifting surface area ratio.

The elongate hull results in a hydrodynamically raised bow early in acceleration, reducing wetted area drag and positioning the aero lifting body at a desirable angle of attack, so as to maximize frontal area exposed to aero RAM pressure. Increased draft and thus buoyancy, improves performance, as the dynamic pressure necessary for lifts increases proportionally with depth. Aero RAM pressure lift is produced by an underside having a relatively large aspect ratio. Once a craft assumes preferred angle of attack, it exposes large frontal area to effects of "pressure". Otherwise lost slipstream kinetic energy is captured to produce a desirable lift.

A sealing of the aft water-air junction (water making desirable seal), produces a high positive pressure a (stagnation pressure) or the bottom surface of the body. This results when flowing air is stagnated, or brought to a standstill, transforming kinetic energy into pressure. Typically, existing craft do not seek to achieve such a desirable seal. Typical wings are used, and of necessity need space between a trailing edge of the wing and water or surface over which vehicle is traveling. Trapping slipstream carries a slight aero drag penalty (frontal area increases) but gain in altitude gives huge reduction in hydro drag (generally a thousand times greater than aero drag).

By way of example, an aero RAM pressure lift can sustain craft independently of hydro lift. As a consequence, production of additional lift via aerofoil mechanics is optional and allows for larger pay loads, improves attitude and stability control, and allows for more efficient movement of the vehicle. In addition, a craft operating continuously in water with water only, or with water and air support, may do without aerofoil lift and free upper structure for ship type use, including very heavy lifts.

By way of example, a hydro lifting hull in keeping with the present invention achieves low drag without losing lift potential by using a "tiered" entry structure. Drag is reduced by using an extremely long length to narrow beam proportions. Embodiments of the present invention use increased draft for improved load carrying capability, with little or no increase in wetted area drag, and use an increased draft for improved lift performance resulting from increased dynamic pressure, exactly what is desirable for a RAM pressure lifting body. Increased draft results going deeper to increase performance is counterintuitive and very likely the reason why it has not been typically used in the art. Embodiments of the present invention also place an angle of attack at or near the center of gravity for easily lifting the bow and reducing wetted area drag. By extending a "tiered" entry rearwardly past amidship, a fine entry is maintained even when hull is bow high at high planing angles of attack.

A RAM craft is a lifting body, it does not need wings and therefore may be shaped with a narrow beam enabling it to handle severe wave conditions and reduce drag at the same time.

By way of example, when equipped with water props, these props will accelerate the craft (gaining altitude), until aft water-air seal is broken. At that time excess lift is dumped thru newly created aft opening and water props stay immersed in water.

If equipped with an air prop and controls, the RAM craft can fly out of water in a so called "ground effect" while still licensed as boat, by way of example current regulations would require FAA certification as an aircraft if craft is powered so as to be capable of free flight. Amphibious capability is available, with addition of retractable landing gear.

A seaplane hull or floats and landing gear, become a hindrance once an aircraft is airborne and a large penalty is paid in performance during operational phase of flight. As the RAM craft's hydro hull is shaped for optimum performance in a fluid, it continues to produce a positive (more lift than drag) contribution to lift in the air. However, for higher speed ground effect and free flight, a retractable hydro lift body may be provided.

A transportation vehicle using lifting body concepts has been shown to provide desirable properties for transiting through and on water, then seamlessly moving onto air supported flight and depending on speed into free flight. Prototype watercraft tested to date have shown a 2 to 4 true improvement in power/payload efficiency.

BRIEF DESCRIPTION OF THE DRAWINGS

Embodiments of the invention are described, by way of example, with reference to the accompanying drawings in which.

DETAILED DESCRIPTION OF THE PREFERRED EMBODIMENTS

The present invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
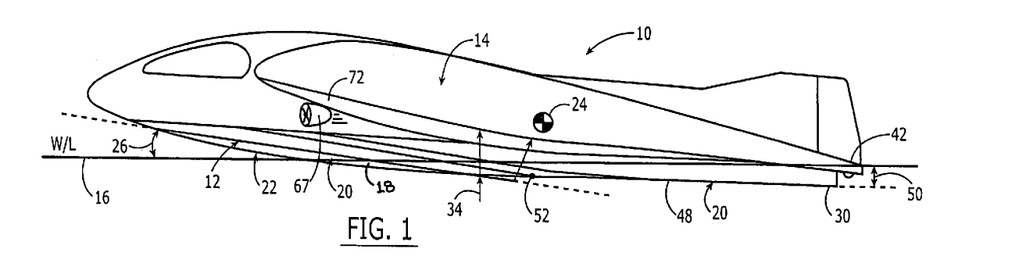
FIG. 1 is a partial port side view of one embodiment of the invention illustrating cooperating lifting bodies.

By way of example for one embodiment of the invention, and with reference initially to FIG. 1, a transportation vehicle 10 is herein described as comprising a first lifting body 12 cooperating with a second lifting body 14 for operating the vehicle over water 16. The first lifting body 12 has an elongate hull 18 for being propelled through the water 16. The elongate hull 18 has a substantially flat first bottom surface 20 extending from a forward most portion 22 of the elongate hull 18 aft to proximate a center of gravity 24 of the vehicle 10. The first bottom surface 20 is defined as having an angle of attack 26 with respect to the surface of the water 16. It will be understood to those of ordinary skill in the art that while an angle of attack is herein illustrated by a straight line the actual body surface shape may be contoured. As illustrated with reference to FIG. 2, a first trailing edge 28 of the elongate hull 18 is operable for forming a seal 30 with the water 16 as the elongate hull 18 is propelled through the water causing a stagnation of the water on a hydro stagnation area 32 of the first bottom surface 20, as illustrated with reference to FIGS. 3A–3C. A center of lift 34 of the first lifting body 12 is forward the center of gravity 24 of the vehicle 10 when the vehicle is being propelled.

Figure 2:
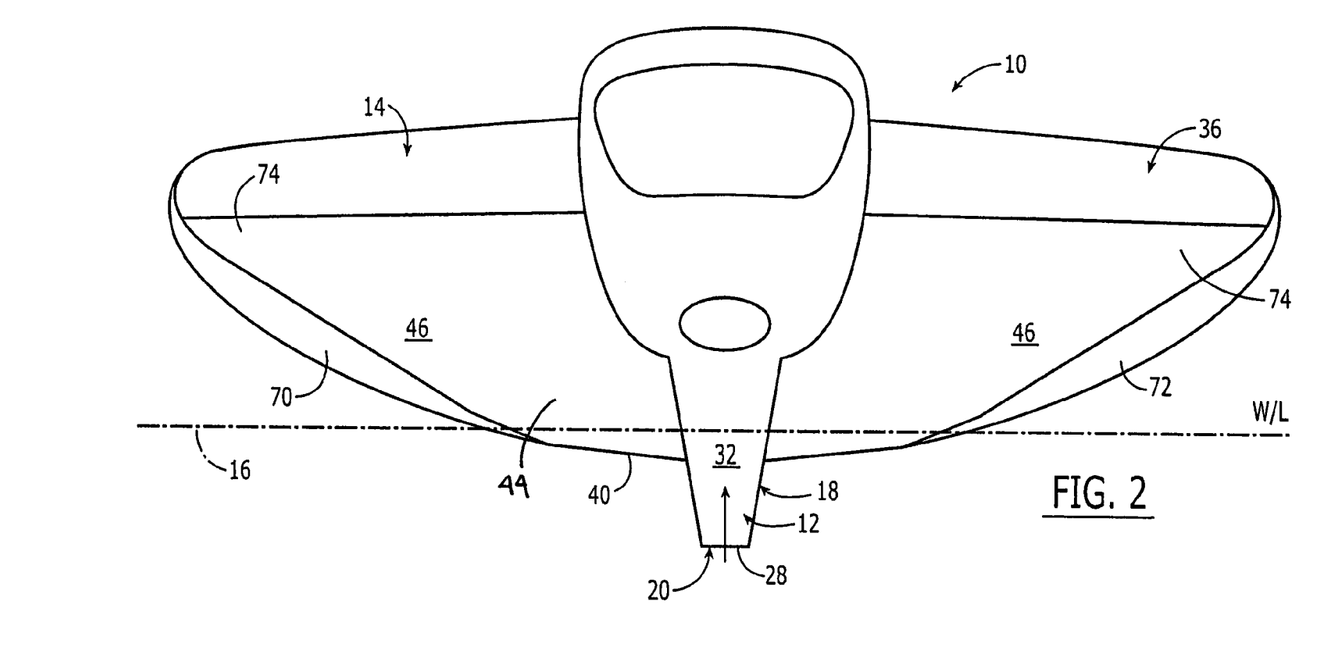
FIG. 2 is a partial front elevation view of the embodiment of FIG. 1.
Figures 3A, 3B, 3C:
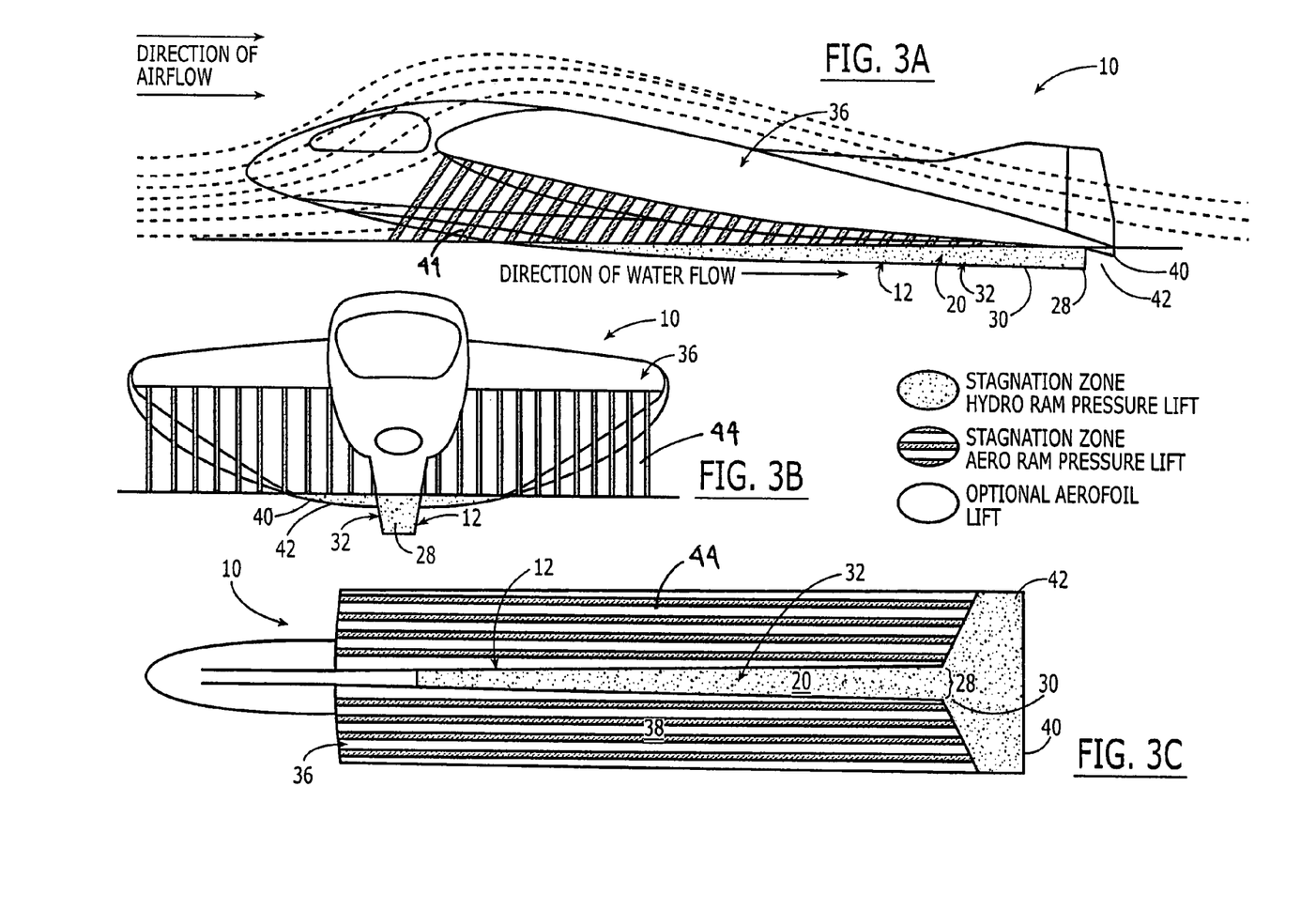
FIGS. 3A, 3B, and 3C are port side elevation, front elevation, and bottom plan views, respectively, for the embodiment of FIG. 1, illustrating hydro RAM pressure lift, aero RAM pressure lift, and stagnation zones, by way of example.

With continued reference to FIGS. 1 and 2, the second lifting body 36 is defined as having a second bottom surface 38 substantially out of contact with the water during operation of the vehicle. The second bottom surface 38 is herein described as having a second trailing edge 40 forming an air-water seal 42 with the water as the second lifting body 36 is propelled causing a stagnation of air 44 is an aero stagnation area 46 on the second bottom surface 38, as illustrated with reference again to FIGS. 3A–3C. The lifting bodies 12, 36 are related in that an aspect ratio of the first bottom surface 20 is greater than the aspect ratio of the second bottom surface 38, wherein the aspect ratio is defined as a ratio of an effective longitudinal length dimension to an effective transverse width dimension forming the stagnation surface areas 32, 46.

With reference again to FIG. 1, the forward portion 22 of the first bottom surface 20 is upwardly angled from an aft portion 48 with a forward-aft angle 50 measured from a location 52 on the first bottom surface 20 proximate and below the center of gravity 24 of the vehicle 10. As illustrated with reference to the embodiments herein described, by way of example, the aft portion 48 smoothly transitions to the forward portion 22 through a non-stepped contiguous change in the angle of attack 26 of the elongate hull 18. However, alternate embodiments may include a longitudinally stepped hull bottom, as desired. Alternatively, the angle of attack 26 of the bottom surface 20 aft of the center of gravity 24 may be positive and negative.

Figure 4A:
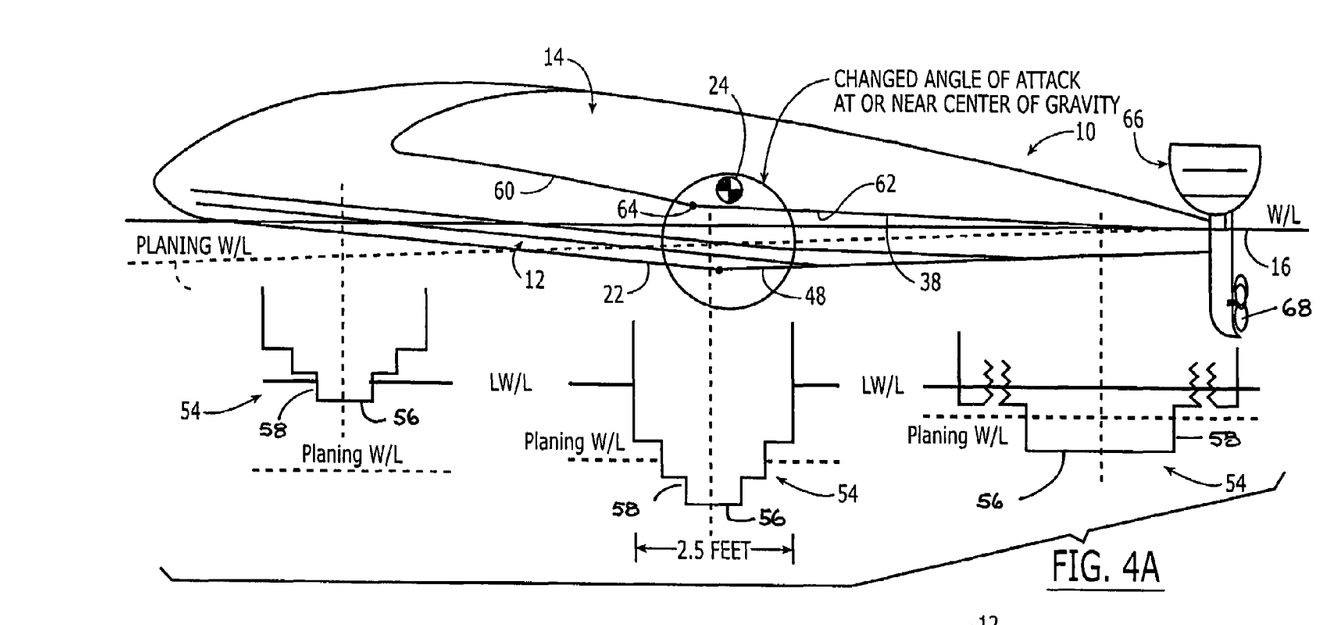
FIG. 4A is a partial side elevation view and associated diagrammatical cross-section views at forward, amidships, and aft locations, illustrating transverse treads of one hydro lifting body, by way of example.
Figure 4B:
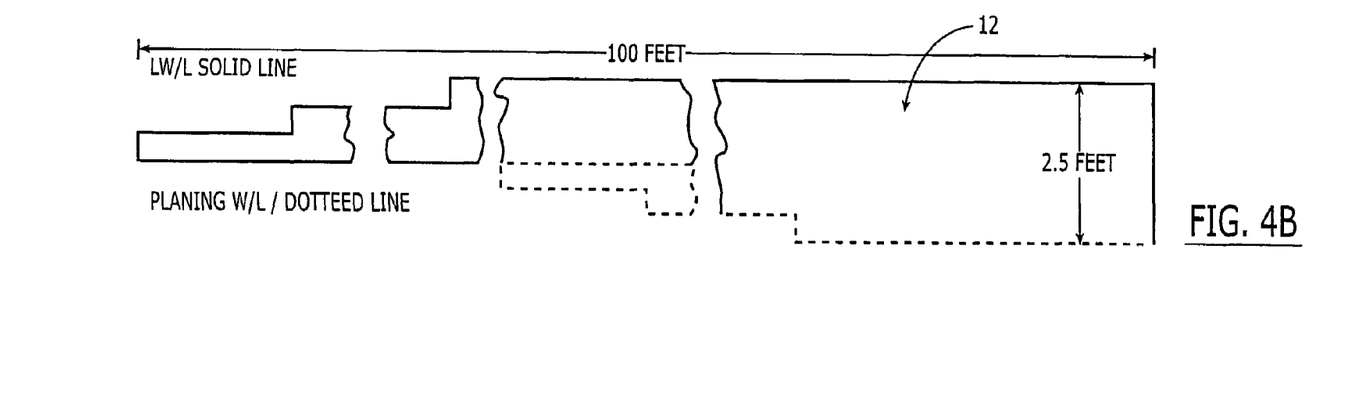
FIG. 4B is a partial broken side view of the hydro lifting body portion of FIG. 4A.

With reference now to FIGS. 4A and 4B, one embodiment of the vehicle 10 may include the elongate hull 18 having a tiered transverse cross section 54 including a horizontal tread 56 and an adjoining vertical riser 58. For the embodiment, herein described by way of example, the horizontal tread 56 has a greater horizontal dimension than a vertical dimension of the vertical riser 58. With continued reference FIG. 4A, by way of example, a forward portion 60 of the second bottom surface 38 is also upwardly angled from an aft portion 62 thereof as measured from a location 64 on the second bottom surface 38 proximate the center of gravity 24 of the vehicle 10. The elongate hull 18 includes a draft sufficient for allowing penetration of the air 44 onto the second bottom surface 38 and for the embodiments herein described by way of example is in a range of two feet to three feet.

Various lifting bodies will be anticipated by those skilled in the art, now having the benefit of the teachings of the present invention. By way of example, the elongate hull may have a length to width ratio dimension of at least seven to one. Embodiments may include the aspect ratio of the first bottom surface significantly greater than the aspect ratio of the second bottom surface. The aspect ratio of the first bottom surface may have a value at least twice the aspect ratio of the second bottom surface, or may be approximately three to one. Aspect ratios may be selected by the vehicle use, such as for personal watercraft, high-speed sports boats, or transports.

Various power sources may be employed for propelling the vehicle 10. As illustrated with reference to FIG. 4A by way of example, means for propelling the vehicle 10 may include a propulsion device 66 operable in the water 16 such as an outboard motor having a propeller 68, or may include an aircraft styled engine operable out of the water. Alternatively, a power assisted RAM pressure (PAR) engine may be employed, as illustrated with reference again to FIG. 1. With reference again to FIGS. 1 and 2, the vehicle 10 may optionally include starboard and port lateral fences 70, 72 extending outwardly from opposing sides of the second bottom surface 38 for forming a plenum cavity 74, thus enhancing performance of the stagnation surface area 46.

By way of further example, consider high angles of attack that produce high drag and interrupt and radically slow the oncoming flow. Specialized craft such as planing boats and shuttle overcome large drag with large power and use their entire underside to interrupt flow. Unlike typical designs, the long narrow elongate hull 18, a hydro lifting body (HLB), has a small underside surface relative to the entire underside surface (A) with an aggressive angle of attack (AOA) sufficient to interrupt laminar flow and cause stagnation or near stagnation pressures which produce most lift provides an effective dynamically active element. To lift a larger body with only a small percentage of underside area distinguishes over typical designs for both planing boats and aero lifting bodies, such as a space shuttle, by way of example.

Figure 5:
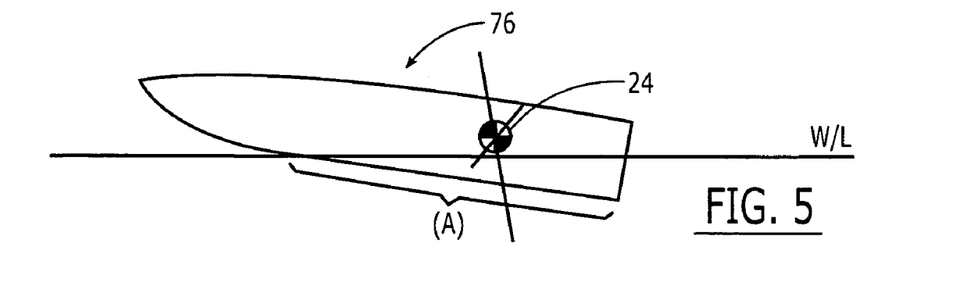
FIGS. 5, 6A, 6B, and 7 are diagrammatical side views of watercraft illustrating characteristics for various embodiments of the invention.
Figure 6A:
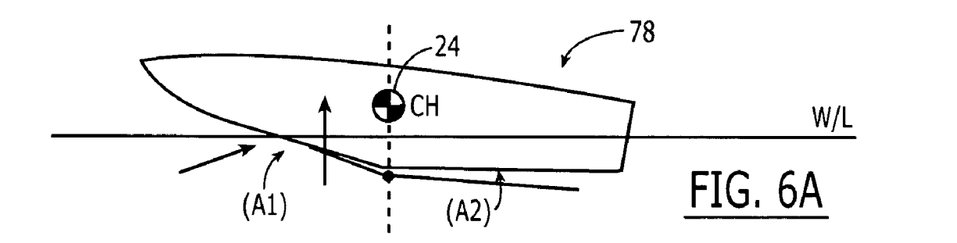
Figure 6B:
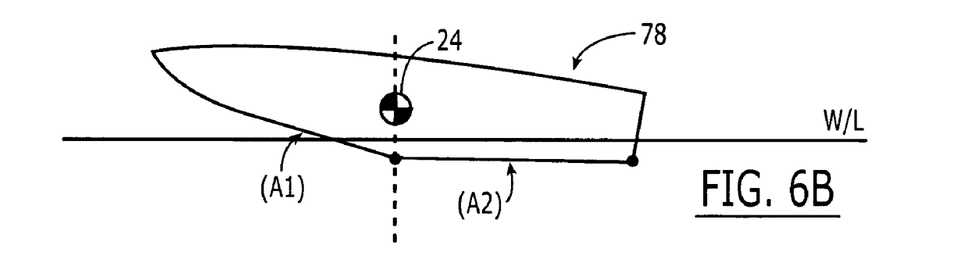
Figure 7:
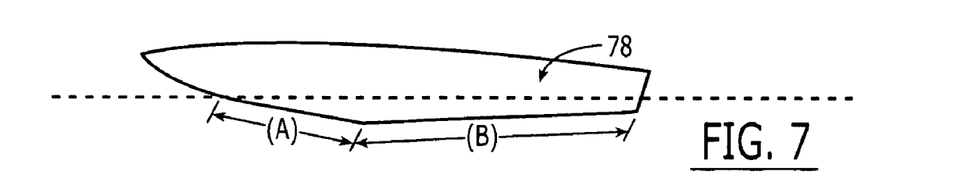
Figure 8A:
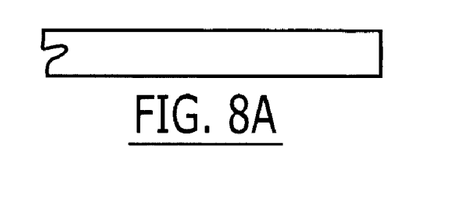
FIGS. 8A and 8B are partial side and plan views, respectively, of aft portions of an alternate elongate hull.
Figure 8B:
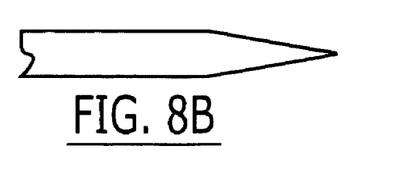
Figure 8C:
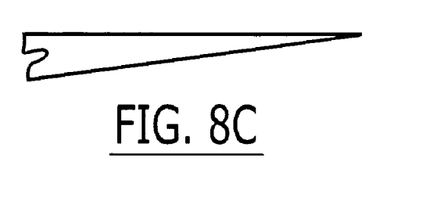
FIGS. 8C and 8D are partial side and plan views, respectively, of aft portions of an alternate elongate hull.
Figure 8D:
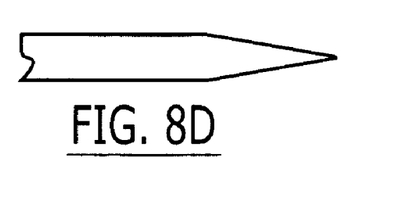
Figure 9A:
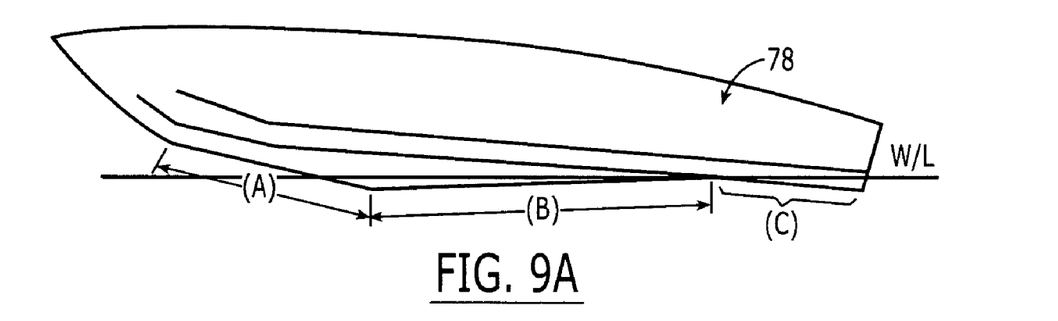
FIGS. 9A and 9B are diagrammatical side and partial bottom views, respectively, of a boat hull illustrating multiple bottom surface area modifications for altering performance.
Figure 9B:
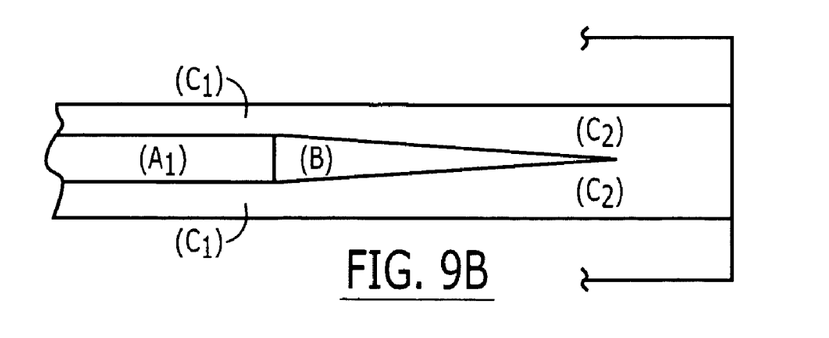

As above described, it will come to the mind of one skilled in the art having the benefit of the teaching of the present invention that an almost infinite number of multiple embodiments are possible. By way of example and with reference to FIG. 5, a primal form (A) can be used as in short boats 76 because the center of lift stays ahead of center of gravity 24. The necessity of achieving lift forward of center of gravity requires moving (A), the first bottom surface 20 earlier described for the embodiments of FIG. 1, and forward for a longer boat 78, as diagrammatically illustrated with reference to FIGS. 6A and 6B. By way of example, (A1) and (A2) can be mechanically adjusted during manufacture. As earlier described, and as further illustrated with reference to FIG. 7, an aft most hull portion, part (B) can have positive or negative angles of attack depending on requirements for stability, load and lift. Edges or chines of both (A) and (B) can be sharp or rounded. Part B can taper to a point or a line. For improved leverage, part (A) can be put forward of a main hull. With a forward part (A) and a tapering part (B), an upswell is created. This is caused by the returning force of water forced down by (A). To exploit this force wake, the step configuration of part (C) as earlier described for a tiered structure can be implemented, as diagrammatically illustrated with reference to FIGS. 9A and 9B.

Part (A) can be broken up in to a tiered configuration as earlier described with reference to FIGS. 4A and 4B, which in effect captures energy produced at the lower portion (A-1) same as part (C) captures and exploits energy produced at (A). Part C can also have a break in it producing $C_1$ and $C_2$. Aft part $C_2$ can have positive, negative or neutral angle of attack. Stability and streamlining requirements will generally define the requirements for a particular shape. For example, an aft $C_2$ with negative angle of attack will tend to lift a bow, while a positive angler of attack will have an opposite effect. It is possible to install a mechanical part ($C_2$) to produce variable geometry, as is with part (B). Mission requirements determine which combination of elements is best suited. In all cases there must be an adequately angled part (A), a small portion of the total underside, for creating a desirable lift.

The hull portion at Part (A) is to be raised as soon as possible, and with as little power as possible. This causes the aero lifting surfaces (D) to come "unstuck" clear of water and immediately start functioning in an aero lifting body mode, which has a compounding or "snowballing" effect. The reduced water resistance allows for increase in speed, which in turn stagnates more air, which produces more lift that further reduces water drag, which further increases speed. Until, for water props and controls, an ideal speed is attained, only a very small portion of (A) and (B) is still in water. By way of example, water props and controls are still operable and a large part of the weight is carried by air.

Figure 10A:
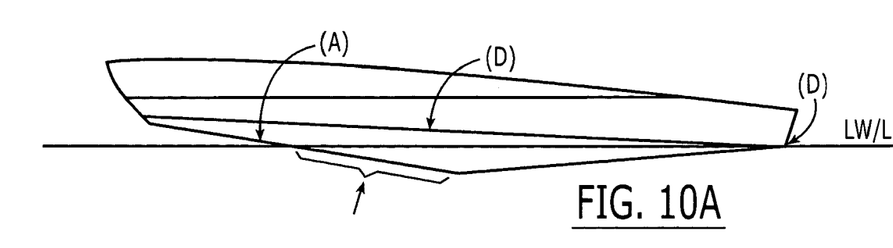
FIGS. 10A and 10B are diagrammatical side and bottom views, respectively, of a boat hull illustrating lifting dynamic pressure supporting surface areas, by way of example.
Figure 10B:
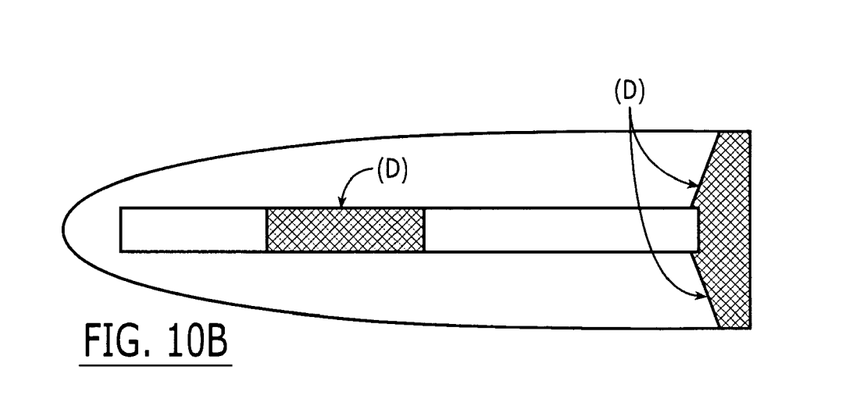
Figure 10C:
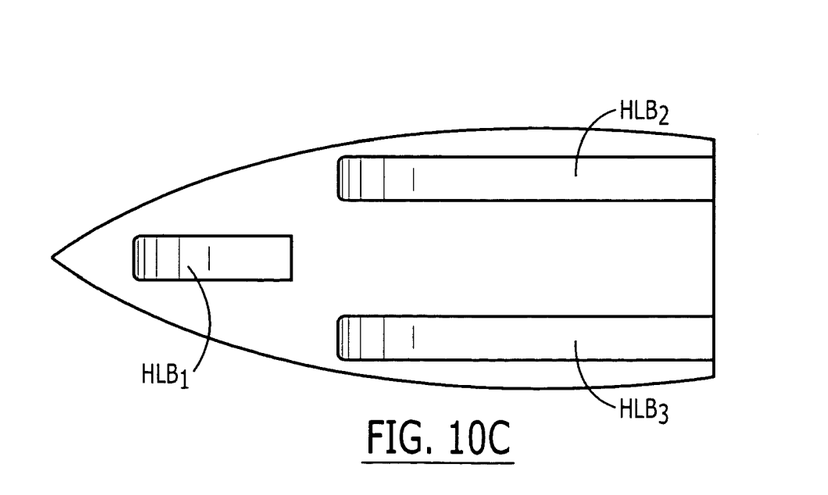
FIG. 10C is a diagrammatical bottom view illustrating use of multiple elongate hulls for a hydro lifting body.

Stability may be achieved using a three point surface support, as illustrated wit reference to FIGS. 10A–10C, for forward lifting surface (A) and the aft trailing edges of aero lifting surfaces (D). The forward support of part (A) counteracts the natural tendency of a lifting body (LB) to pitch down by the bow as the center of lift moves aft with speed increasing. The aft seal of (D) with water creates a sealed plenum that obviates the need for a 30°–40° high drag angle of attack used by typical aero lifting bodies. At slow speeds parts A, B, C, and D are hydro surfaces, but as a craft lifts they become aero lifting surfaces.

Its above supported, a hydro lifting body provides a relatively small bottom surface area when compared to standard hulls. As a result the high aspect ratio of longitudinal length to transverse width produces a desirable lift without an undesirable drag. As a result and by way of example, when needing to support a large gross weight (vehicle and/or payload), multiple hydro lifting bodies may be employed as illustrated diagrammatically with reference to FIG. 10C.

Figure 11A:
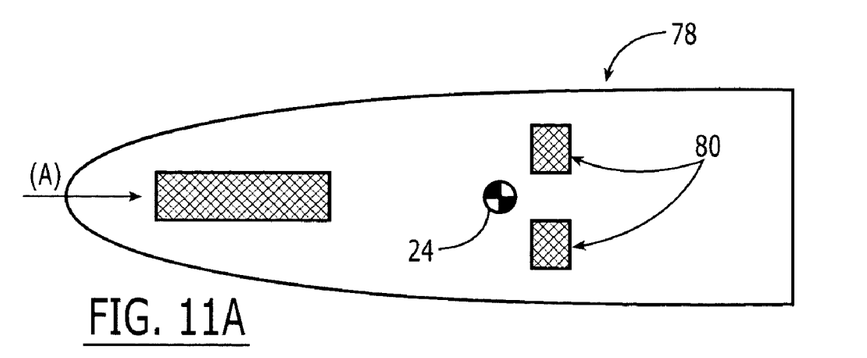
FIGS. 11A and 11B are diagrammatical bottom views, respectively, of a boat hull illustrating use of controlling flaps.
Figure 11B:
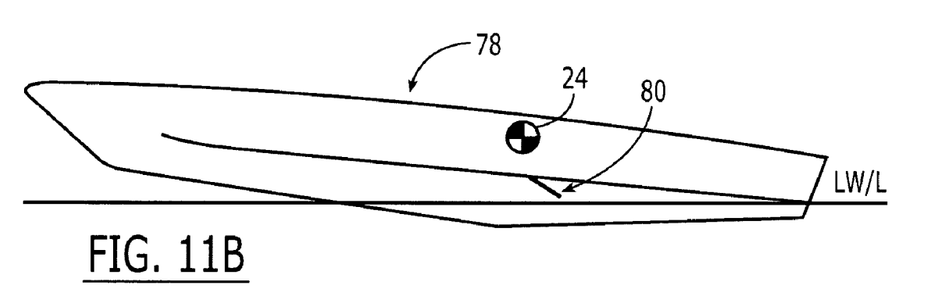

For solely aero lift, without having to subject whole craft to a 30°–40° angle of attack, a flap 80 may be deployed on both sides of a center hydro lifting body at or close to the center of gravity 24 as illustrated with reference to FIGS. 11A and 11B. By positioning the flap 80 forward or back one can move the center of lift as needed to counteract a tendency to pitch bow down. The use of flaps may contribute to the three point support described above.

Prototype watercraft tested to date have shown a 2 to 4 true improvement in power/payload efficiency.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A transportation apparatus comprising:
    a first lifting body having an elongate hull operable for being propelled through a first medium, the elongate hull having a substantially flat first bottom surface, the first lifting body extending downwardly sufficient for increasing dynamic pressure thereon for reducing wetted area and frontal area drag, wherein the first bottom surface is defined as having an angle of attack with respect to the first medium, and wherein a first trailing edge of the elongate hull is operable for forming a seal with the first medium as the elongate hull moves therethrough causing a stagnation of the first medium on the first bottom surface, and wherein a center of lift of the first lifting body is forward the center of gravity of the apparatus when being propelled; and
    a second lifting body operable with the first lifting body for being propelled therewith in a second medium, the second lifting body extending outwardly from the first lifting body, wherein a second bottom surface of the second lifting body is substantially out of contact with the first medium during operation of the apparatus in the first and second media, and, wherein a second trailing edge of the second bottom surface is operable for forming a seal with the first medium as the second lifting body is propelled causing a stagnation of the second medium on the second bottom surface, and wherein an aspect ratio of the first bottom surface is greater than the aspect ratio of the second bottom surface, the aspect ratio being defined as a ratio of an effective longitudinal length dimension to an effective transverse width dimension for forming a stagnation surface area.

2. The apparatus according to claim 1, wherein a forward portion of the first bottom surface is upwardly angled from an aft portion thereof as measured from a location on the first bottom surface proximate a center of gravity of the apparatus.

3. The apparatus according to claim 2, wherein the aft portion smoothly transitions to the forward portion through a non-stepped contiguous change in the angle of attack of the elongate hull as it moves through the first medium.

4. The apparatus according to claim 2, wherein the angle of attack of the bottom surface aft of a center of gravity is one of positive and negative.

5. The apparatus according to claim 1, wherein the elongate hull comprises a tiered transverse cross section including a horizontal tread portion and a vertical riser portion.

6. The apparatus according to claim 5, wherein the horizontal tread portion has a greater horizontal dimension than a vertical dimension of the vertical riser portion.

7. The apparatus according to claim 6, wherein the substantially flat bottom surface includes an aft portion smoothly transitioning to a forward portion through a non-stepped contiguous change in the angle of attack.

8. The apparatus according to claim 1, wherein a forward portion of the second bottom surface is upwardly angled from an aft portion thereof as measured from a location on the second bottom surface proximate the center of gravity of the apparatus.

9. The apparatus according to claim 1, wherein the first lifting body comprises a draft dimension of at least a width dimension uniformly along a longitudinally length thereof.

10. The apparatus according to claim 1, wherein the first medium is water.

11. The apparatus according to claim 1, wherein the aspect ratio of the first bottom surface is significantly greater than the aspect ratio of the second bottom surface.

12. The apparatus according to claim 1, wherein the aspect ratio of the first bottom surface has a value at least twice the aspect ratio of the second bottom surface.

13. The apparatus according to claim 1, wherein the aspect ratio of the second bottom surface is approximately three to one.

14. The apparatus according to claim 1, wherein the elongate hull includes a draft sufficient for allowing penetration of the second medium onto the second bottom surface in a range of two feet to three feet.

15. The apparatus according to claim 1, further comprising a plurality of flaps deployable for providing lift to the second lifting body.

16. The apparatus according to claim 15, further comprising propelling means including at least one of a propulsion device operable with the first medium and a propulsion device operable with the second medium.

17. The apparatus according to claim 15, wherein the propulsion device comprises a propeller.

18. The apparatus according to claim 1, further comprising starboard and port lateral fences extending outwardly from opposing side portion of the second bottom surface for forming a plenum cavity including the second bottom surface, thus enhancing performance of the stagnation surface area.

19. A transportation apparatus operable over water, the apparatus comprising:
 a first lifting body having an elongate hull, the elongate hull having a substantially flat first bottom surface, the first lifting body extending downwardly sufficient for increasing dynamic pressure thereon for reducing wetted area and frontal area drag, wherein the first bottom surface is defined as having an angle of attack with respect to water over which the apparatus travels, and wherein a first trailing edge of the elongate hull is operable for forming a seal with the water causing a stagnation of the water on the first bottom surface, and wherein a center of lift of the first lifting body is forward the center of gravity of the apparatus when being propelled; and
 a second lifting body operable with the first lifting body and extending outwardly therefrom, the second lifting body having a second bottom surface substantially out of contact with the water during operation of the apparatus, and wherein a second trailing edge of the second bottom surface is operable for forming a seal with the water as the second lifting body is propelled causing a stagnation of air on the second bottom surface, and wherein an aspect ratio of the first bottom surface is greater than the aspect ratio of the second bottom surface, the aspect ratio being defined as a ratio of an effective length dimension to an effective width dimension for forming a stagnation surface area.

20. The apparatus according to claim 19, wherein a forward portion of the first bottom surface is upwardly angled from an aft portion thereof as measured from proximate a center of gravity of the apparatus.

21. The apparatus according to claim 20, wherein the aft portion smoothly transitions to the forward portion through a non-stepped contiguous change in the angle of attack of the elongate hull.

22. The apparatus according to claim 20, further comprising a plurality of flaps deployable for providing lift to the second lifting body.

23. The apparatus according to claim 19, wherein the elongate hull comprises a tiered transverse cross section including a horizontal tread portion and a vertical riser portion.

24. The apparatus according to claim 19, wherein a forward portion of the second bottom surface is upwardly angled from an aft portion thereof as measured from a location proximate the center of gravity of the apparatus.

25. The apparatus according to claim 19, wherein the elongate hull comprises a length to width ratio dimension in a range of at least seven to one to at least two to one.

26. The apparatus according to claim 19, wherein the aspect ratio of the first bottom surface is significantly greater than the aspect ratio of the second bottom surface.

27. The apparatus according to claim 19, wherein the elongate hull includes a draft sufficient for allowing penetration of the air onto the second bottom surface in a range of approximately one feet to three feet.

28. The apparatus according to claim 19, further comprising means for propelling the apparatus.

29. The apparatus according to claim 19, further comprising starboard and port lateral fences extending outwardly from opposing side portion of the second bottom surface for forming a plenum cavity including the second bottom surface.

30. A transportation method comprising:
 providing a first lifting body having an elongate hull, the elongate hull having a substantially flat first bottom surface, wherein the first bottom surface is defined as having an angle of attack with respect to the water within which the apparatus operates, and wherein a center of lift of the first lifting body is forward the center of gravity of the apparatus when being propelled;
 providing a second lifting body operable with the first lifting body, wherein a second bottom surface of the second lifting body is substantially out of contact with the water during operation of the apparatus, and wherein an aspect ratio of the first bottom surface is greater than the aspect ratio of the second bottom surface, the aspect ratio being defined as a ratio of an effective length dimension to an effective width dimension for forming a stagnation surface area;
 propelling the apparatus at an initial speed on the water;
 increasing the speed of the apparatus while a first trailing edge of the elongate hull forms a seal with the water as the elongate hull moves therethrough causing a stagnation of the water on the first bottom surface;
 continuing to increase the speed of the apparatus while a second trailing edge of the second bottom surface forms a seal with the water as the second lifting body is propelled causing a stagnation of air on the second bottom surface; and
 further increasing the speed of the apparatus until the second lifting body is entirely out of contact with the water, the first lifting body remaining in contact therewith.

* * * * *